United States Patent [19]

Munoz et al.

[11] Patent Number: 5,137,443
[45] Date of Patent: Aug. 11, 1992

[54] APPARATUS FOR FORMING HOLLOW PLASTIC ARTICLE

[75] Inventors: Oscar Munoz, Mississauga; John Galt, Bolton, both of Canada

[73] Assignee: Husky Injection Molding Systems Ltd., Bolton, Canada

[21] Appl. No.: 698,282

[22] Filed: May 10, 1991

[51] Int. Cl.$^5$ .............................................. B29C 49/56
[52] U.S. Cl. ................................... 425/522; 425/534; 425/541
[58] Field of Search ............... 425/534, 522, 529, 535, 425/541, 525, 528

[56] References Cited

U.S. PATENT DOCUMENTS

| | | | |
|---|---|---|---|
| 4,426,202 | 1/1984 | Krishnakumar et al. | 425/534 |
| 4,432,720 | 2/1984 | Wiatt et al. | 425/541 X |
| 4,505,664 | 3/1985 | Craig | 425/525 |
| 4,690,633 | 9/1987 | Schad et al. | 425/528 X |
| 4,818,212 | 4/1989 | Gibbemeyer | 425/535 X |
| 5,035,603 | 7/1991 | Unterlander et al. | 425/522 |

*Primary Examiner*—Richard L. Chiesa
*Attorney, Agent, or Firm*—Bachman & LaPointe

[57] ABSTRACT

The apparatus includes a blow mold for forming a hollow plastic article from a parison including at least two reciprocable mold portions movable from an open position to a closed position, a holding device for holding the parison within the blow mold, and first and second locking portions affixed to the holding device and blow mold portions, respectively, engagable with each other when the blow mold portions are in a closed position to align and clamp the holding device to the blow mold, whereby blowing force is transmitted to the engaged locking portions.

16 Claims, 4 Drawing Sheets

APPARATUS FOR FORMING HOLLOW PLASTIC ARTICLE

BACKGROUND OF THE INVENTION

Plastic parisons or preforms are conventionally reheated and formed into hollow plastic articles by stretch blow molding in a blow mold using a stretch rod and high pressure fluid.

The preforms are preheated in ovens immediately prior to being transferred into a blow mold. Incorporated with the blow mold are stretch rods which typically enter the preform from its open end and extend during the blow stage to cause biaxial orientation of the blown article. The motion of the stretch rod should be synchronized with the blowing of the high pressure fluid so that the preform is stretched along its longitudinal axis by the rod and simultaneously or sequentially stretched perpendicular to this axis by the pressure of the incoming fluid to orient its molecules for greater strength.

A two stage reheat blowing machine of the type described in U.S. Pat. Nos. 4,793,960, 4,690,633 and 4,522,581 uses a series of pallets to carry preforms through a series of processing stages: thermal conditioning, stretch-blow molding and strip-off or ejection. At the stretch-blow molding station it is important that the preform is accurately aligned with the blow mold to insure that the finished blown article is symmetrically formed with respect to the neck finish. It is also important that the means used to seal the interior of the preform effectively prevent the escape of the high pressure, typically 700 psi, fluid used to blow the preform within the closed mold. Loss of the fluid reduces the effectiveness of the blowing, creates noise, and may cause the neck finish to be deformed if leakage occurs in that area.

Prior art machines for stretch blowing and using preforms mounted on traveling pallets by means of mandrels include U.S. Pat. Nos. 4,505,664, 4,426,202, 4,470,797, 4,487,568 and 4,456,447. Usually the mandrel is fitted inside the preform's neck finish with a minimum gap to reduce air leakage. The '568 and '447 patents show external latches to hold the preform on the mandrel and the '797 patent shows a spring loaded detent for the same purpose. In these cases the preform is depending from the mandrel/holder and unless restrained would possibly fall off, given the amount of machine vibration and motion that it is subjected to.

Prior art machines simply close the blow mold halves trapping the preform's neck finish between the mold halves and the inner mandrel, thus initially achieving an air tight seal. However, the high pressure blowing fluid may cause the neck finish to separate from the mandrel and allow the fluid to leak, and also act on the inner wall of the neck finish causing it to deform. This deficiency is particularly prone to occur when large diameter preforms are being blown. Here the large projected area of the neck finish can be easily deformed when exposed to the blowing fluid. Prior art machines rely on the engagement of the mold directly with the preform to align the preform within the closed mold. In some cases the preform may not be perfectly aligned, or may be moved off center by the action of the stretch rod acting inside the preform during stretching. Consequently the blown article's body may not be aligned with its neck finish. The '664 reference forms an internal thread in the blown part and the blow nozzle must be unscrewed from the part before the mold can be opened. U.S. Pat. Nos. 4,818,212 and 4,036,573 also show typical stretch blow nozzle arrangements.

Accordingly, it is a principal object of the present invention to provide an apparatus for forming hollow plastic articles including a blow mold which aligns and clamps the parison to the blow mold in a convenient and effective manner.

It is a further object of the present invention to provide an apparatus as aforesaid adaptable to various size preforms and which permits the use of high pressure fluid without leakage.

Further objects and advantages of the present invention will appear hereinbelow.

SUMMARY OF THE INVENTION

In accordance with the present invention the foregoing objects and advantages are readily obtained. The apparatus of the present invention comprises: a blow mold for forming a hollow plastic article from a parison including at least two reciprocable mold portions movable from an open position to a closed position; holding means for holding the parison within the blow mold including channel means within the holding means communicating with the parison permitting the introduction of high pressure fluid into the parison to expand same into conformity with the blow mold, and mandrel means supporting the parison and including means permitting the parison to rotate; and first locking means affixed to the holding means and second locking means affixed to at least one blow mold portion, said first and second locking means being engagable with each other when the blow mold portions are in a closed position to align and clamp the holding means and parison to the blow mold, whereby blowing force from the high pressure fluid is transmitted to the engaged locking means.

In a preferred embodiment, the holding means includes a rotatable spindle and the first locking means comprises a taper lock on the upper portion of the spindle and the second locking means comprises a taper lock mating with the first locking means and affixed to the blow mold portions.

In a particularly preferred embodiment, the spindle includes a spindle insert having a raised portion engagable with the inner surface of the parison neck, said raised portion including sealing means to seal the parison to the spindle insert and prevent leakage of high pressure fluid. The spindle insert may desirably include mounted thereon a U-shaped channel portion engagable with the inner and outer surface of the parison neck, wherein the sealing means may be between the raised portion of the spindle insert and the channel portion to insure that high pressure fluid does not reach the inner surface of the parison neck.

Further advantageous features of the present invention will appear hereinbelow.

BRIEF DESCRIPTION OF THE DRAWINGS

The present invention will be more readily understandable from a consideration of the accompanying drawings, wherein.

DETAILED DESCRIPTION OF THE PREFERRED EMBODIMENTS

Figure 1:
FIG. 1 is a block diagram showing the stations through which the parisons pass.

Referring to the drawings, FIG. 1 shows in a block diagram the preferred cycle from injection station where the parisons or preforms are prepared, to receiving station where they are transferred to holding means including mandrels, preferably by a robot, to a temperature conditioning station where the temperature is adjusted so as to be suitable for blowing and biaxial orientation, to the blowing station, and finally to the blown article removal station. The cycle is shown in U.S. Pat. No. 4,690,633, the disclosure of which is hereby incorporated by reference. The particular features of the overall cycle are not critical to the present invention. Thus, one can readily use an apparatus as shown and described in U.S. Pat. No. 4,690,633. The parisons may or may not be prepared in-line with the other operations and may readily be made at a different time. The transfer path may take the form of an oval path, a straight path, or a horse-shoe shaped path, or any convenient configuration.

The apparatus of the present invention is directed to the alignment and clamping of the holding means and parison to the blow mold and to minimizing adverse effects of the blowing force from the high pressure fluid.

Figure 2:
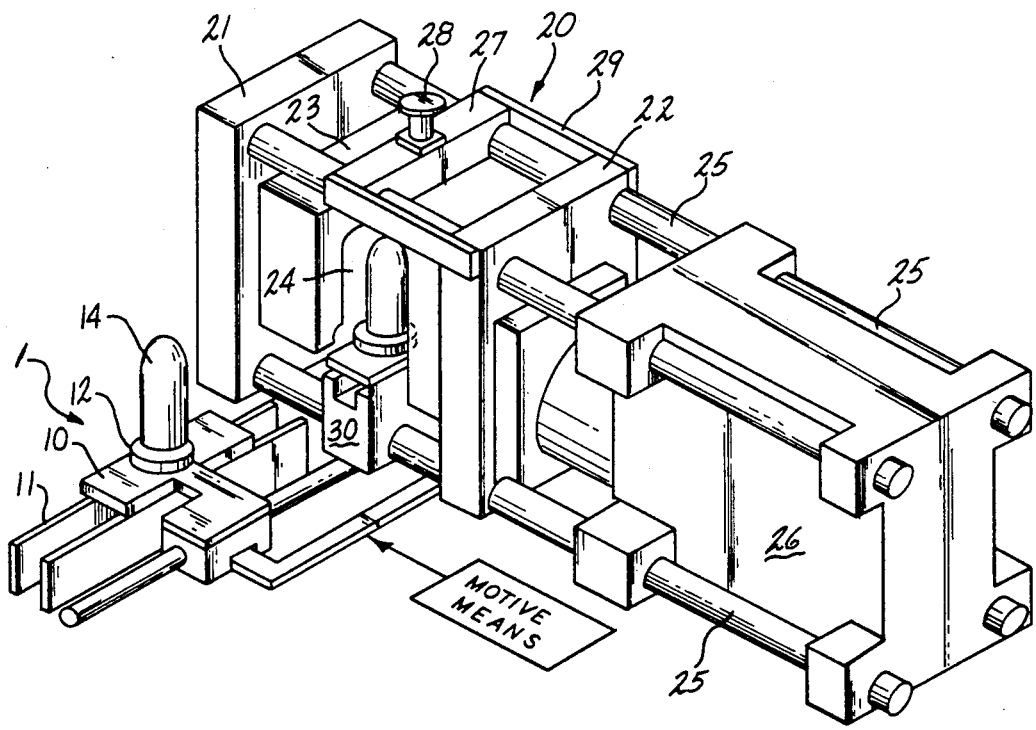
FIG. 2 is an isometric view of the finishing station.

FIG. 2 is a isometric schematic view of the holding means with parison thereon aligned and ready to be received by the blow mold. FIG. 2 shows a single holding means carrying a single parison; however, it should be understood that the present invention may readily be used when the holding means carries a plurality of parisons or when a plurality of mandrels carry a plurality of parisons. For convenience, in the following discussion, the present invention has been described with a single holding means carrying a single parison.

Referring to FIG. 2, holding means includes pallets 10 retained in channel track 11 having been transferred thereto from the conditioning station by means not shown. Pallets 10 hold rotatable mandrels 12 which in turn hold parisons or preforms 14. The particular parison shape is representative only and any suitable shape can be used. The parison and mandrel arrives at the blowing station after traversing a conditioning station on a rotating mandrel as described in the aforesaid U.S. Pat. No. 4,690,633.

Blowing station or finishing station 20 includes fixed platen 21 and movable platen 22 with blow mold 23 therebetween containing a mold 24 in the shape of the hollow article to be formed. Movable platen 22 moves on tie rods 25 activated by motor 26. Base mold 27 is positioned above mold 24 to form the article bottom with piston 28 connected thereto for moving the bottom mold into appropriate alignment for formation of the desired base for the article and motive means (not shown) connected thereto for activating said piston. Linkage means 29 are provided connected to the movable platen 22 and bottom mold 27 in order to maintain the desired positioning thereof. For clarity only the top linkage means are shown in FIG. 2. Channel track 30 sits spaced from but closely adjacent to channel track 11 so that pallets 10 can readily move into position in the blow mold. The holding means includes depending leg or spindle to be described hereinbelow which may be engaged by a chain link or any desired motive means for moving the pallet. As shown in FIG. 2, one mandrel-parison assembly is in position in the blow mold while a second is ready to be moved into the blow mold.

Referring to FIGS. 3-6, holding means 1 includes pallet 10 which travels between a pair of wear strips 40. The pallet carries at least one spindle 41 in a bushing 42 which permits the spindle to spin. Spindle 41 is hollow including channel means 43 therein communicating with the inside of parison 14 permitting the introduction of high pressure fluid from blow nozzle 44 and from an appropriate source (not shown) into the parison to expand same into conformity with mold 24 of blow mold 23 as shown in FIG. 2. Stretch rod 45 is movable in channel means 43 and into parison 14 in a conventional manner.

Upper portion of spindle 41 adjacent blow mold 23 includes first locking means comprising circular tapered portions 50 and 51 which engage second locking means comprising a corresponding pair of mold tapered portions 52 and 53. Spindle tapered portions extend outwardly with a generally pie-shaped configuration in cross-section. Mold tapered portions 52 and 53 are bolted to the lower surface of blow mold 23 by bolts (not shown) and aligned with dowels 54 and extend inwardly with a generally pie-shaped configuration. Therefore, when mold 23 closes mold tapered portions 52 and 53 surround spindle 41 and engage spindle tapered portions 50 and 51 as clearly shown in FIGS. 5 and 6. This causes the spindle together with the parison to be firmly clamped by the locking means and properly aligned with the blow mold.

Figure 5:
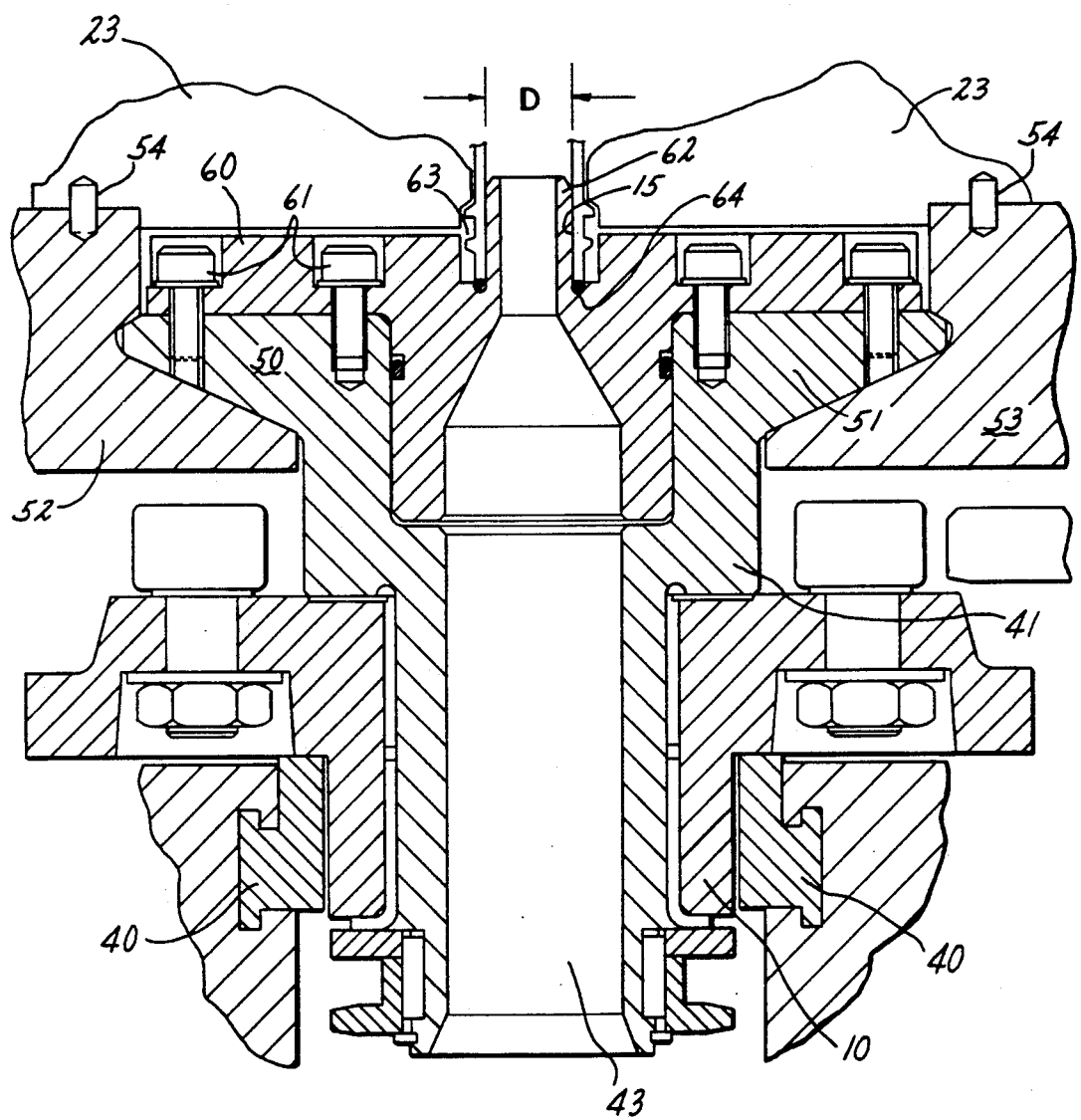
FIGS. 5 and 6 show sectional views of the apparatus of the present invention for small and large diameter parisons, respectively.

Interchangable spindle insert 60 is carried by spindle 41 between blow mold 24 and taper locks 50, 51, 52 and 53. Bolts 61 affix spindle insert 60 to spindle 41. Referring to FIG. 5, spindle insert 60 includes raised portion 62 engagable with the inner surface of the parison neck 15. Thus, advantageously the blowing force developed by the high pressure fluid acting on the spindle insert 60 is carried by the taper locks and is not transmitted through spindle 41 to the mechanism below.

Figure 3:
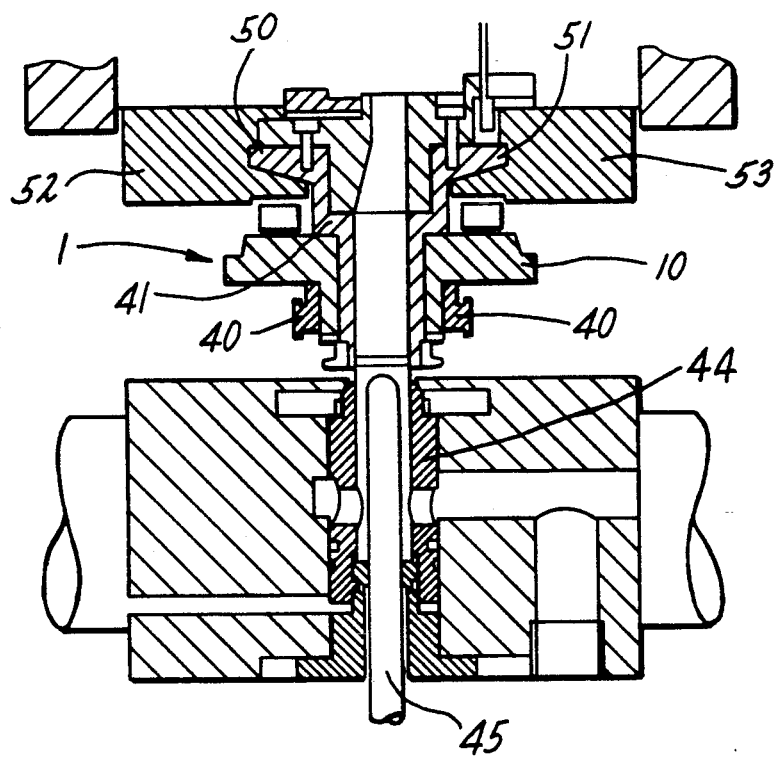
FIG. 3 shows a sectional view of the apparatus of the present invention.
Figure 4:
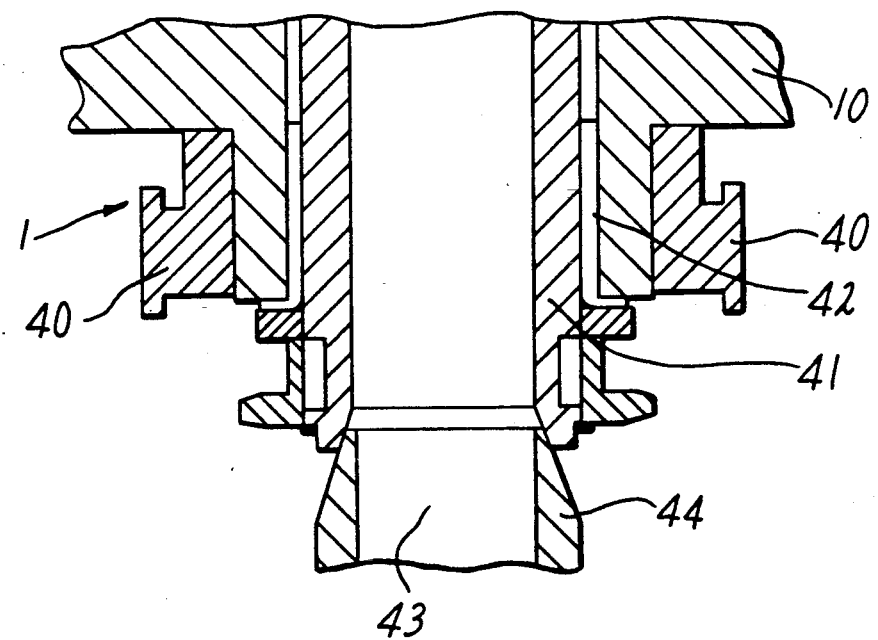
FIG. 4 shows a detailed sectional view of the engagement of the blowing nozzle and the holding means.
Figure 6:
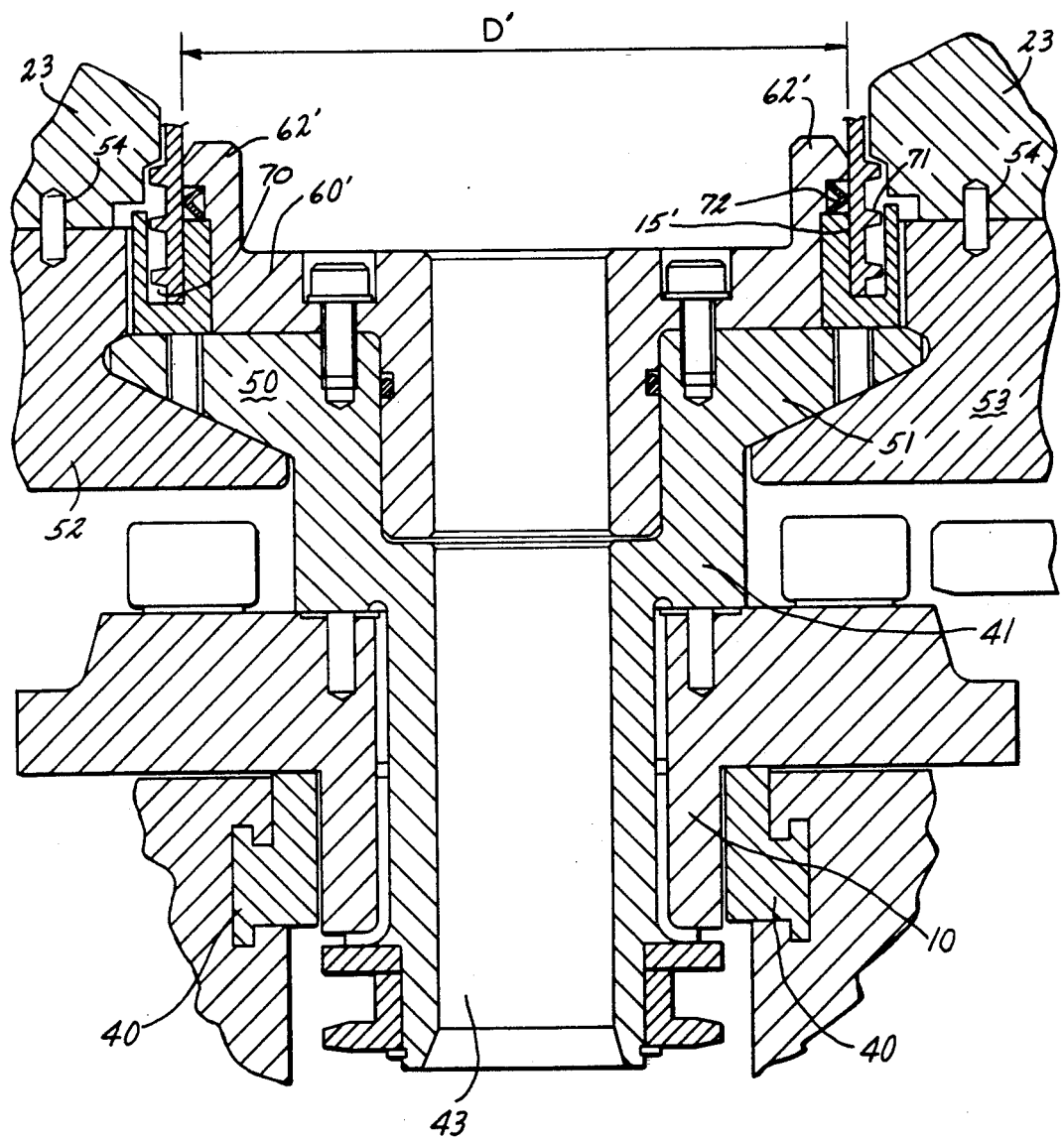

FIG. 5 shows a spindle insert 60 suitable for a small diameter neck finish D and FIG. 6 shows a spindle insert 60' suitable for a large diameter neck finish D'. The right half of FIG. 3 shows a large diameter neck finish and the left half a small diameter neck finish.

In the embodiment of FIG. 5, raised portion 62 forms a generally U-shaped channel 63 with spindle insert 60 which receives parison neck 15. Sealing means 64 such as an O-ring, is provided at the base of the U-shaped channel 63 adjacent the base of neck 15 to seal the parison to the spindle insert and prevent leakage of high pressure fluid. The U-shaped channel 63 also serves to protect the parison neck 15 seated therein during the passage of the parison through the ovens of the conditioning station.

In addition, the foregoing construction provides protection to the preform neck finish from exposure to high pressure blowing fluid. The foregoing construction together with the comparatively small diameter of the parison neck finish insures that the exposure to high pressure blowing fluid will not cause the neck finish diameter to be increased due to the effect of the high pressure of the blowing fluid.

FIG. 6 shows a spindle insert 60' suitable for a large diameter neck finish D'. Spindle insert 60' includes raised portion 62' engagable with the inner surface of parison neck 15'. In addition, spindle insert 60' includes channel portion 70 mounted on spindle 41 including a generally U-shaped channel 71 which receives parison neck 15'. Spring actuated cup seal 72 is provided between spindle insert raised portion 62' and channel portion 70 to insure that high pressure fluid does not reach the inner surface of parison neck 15'. In addition, channel portion 70 provides protection from oven heat during passage of the parison through the ovens of the conditioning station. Further, the foregoing construction insures that pressure fluid is prevented from leaking and from acting on the inner surface of the neck finish as well as preventing transmission of blowing force through the spindle to the mechanism below.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. Apparatus for forming a hollow plastic article which comprises:
   a blow mold for forming a hollow plastic article from a parison including at least two reciprocable mold portions movable from an open position to a closed position;
   holding means for holding the parisons within the blow mold including channel means within the holding means communicating with the parison permitting the introduction of high pressure fluid into the parison to expand same into conformity with the blow mold and mandrel means supporting the parison and including means permitting the parison to rotate and parison engaging means engagable with the neck of the parison; and
   first locking means affixed to the holding means and second locking means affixed to at least one blow mold portion, said first and second locking means being spaced from the parison engaging means when the blow mold portions are in the open and closed positions and being engagable with each other when the blow mold portions are in a closed positions to align and clamp the holding means to the blow mold, whereby blowing force from the high pressure fluid is transmitted to the engaged locking means.

2. An apparatus according to claim 1 wherein the first locking means comprises a taper lock and the second locking means comprises a taper lock mating with the first locking means and affixed to the blow mold portions.

3. An apparatus according to claim 1 including a stretch rod movable in the channel means to engage the parison in the blow mold.

4. An apparatus according to claim 1 including means for introduction of fluid pressure to the channel means and into the parison.

5. An apparatus according to claim 1 wherein the locking means are operative to align and clamp the holding means to the blow mold without clamping the holding means against the parison.

6. Apparatus for forming a hollow plastic article which comprises:
   a blow mold for forming a hollow plastic article from a parison including at least two reciprocable mold portions movable from an open position to a closed position;
   holding means for holding the parisons within the blow mold including channel means within the holding means communicating with the parison permitting the introduction of high pressure fluid into the parison to expand same into conformity with the blow mold and mandrel means supporting the parison and including a rotatable spindle permitting the parison to rotate and parison engaging means engagable with the neck of the parison; and
   first locking means comprising a taper lock affixed to the holding means and second locking means comprising a taper lock means affixed to at least one blow mold portion, said first and second locking means being spaced from the parison engaging means when the blow mold portions are in the open and closed positions and being engagable with each other when the blow mold portions are in a closed positions to align and clamp the holding means to the blow mold, whereby blowing force from the high pressure fluid is transmitted to the engaged locking means.

7. An apparatus according to claim 6 wherein said taper locks comprise mating circular taper portions.

8. Apparatus for forming a hollow plastic article which comprises:
   a blow mold for forming a hollow plastic article from a parison including at least two reciprocable mold portions movable from an open position to a closed position;
   holding means for holding the parisons within the blow mold including channel means within the holding means communicating with the parison permitting the introduction of high pressure fluid into the parison to expand same into conformity with the blow mold and mandrel means supporting the parison and including a rotatable spindle permitting the parison to rotate, and wherein said spindle includes a spindle insert having a raised portion engageable with the inner surface of the parison neck including sealing means to seal the parison to the spindle insert and prevent leakage of high pressure fluid; and
   first locking means comprising a taper lock affixed to the holding means and second locking means affixed to a taper lock means affixed to at least one blow mold portion, said first and second locking means being engageable with each other when the blow mold portions are in a closed position to align and clamp the holding means to the blow mold, whereby blowing force from the high pressure fluid is transmitted to the engaged locking means.

9. An apparatus according to claim 8 wherein the spindle insert is between the blow mold and the taper locks so that blowing force from the high pressure fluid acts on the spindle insert and is transmitted to the engaged tapered locks.

10. An apparatus according to claim 8 wherein the spindle insert includes a recess portion adjacent the raised portion to seat and protect the inner surface of the parison neck.

11. An apparatus according to claim 8 wherein the spindle insert is removable for different size parison necks.

12. An apparatus according to claim 8 wherein the spindle insert includes a channel portion mounted on the spindle.

13. An apparatus according to claim 12 wherein the channel portion is U-shaped and is engagable with the inner and outer surface of the parison neck.

14. An apparatus according to claim 13 wherein said sealing means is between the raised portion of the spindle insert and the channel portion and insures that high pressure fluid does not reach the inner surface of the parison neck.

15. An apparatus according to claim 14 wherein said sealing means is a spring actuated cup seal.

16. Apparatus for forming a hollow plastic article which comprises:
   a blow mold for forming a hollow plastic article from a parison including at least two reciprocable mold portions movable from an open position to a closed position;
   holding means for holding the parisons within the blow mold including channel means within the holding means communicating with the parison permitting the introduction of high pressure fluid into the parison to expand same into conformity with the blow mold and mandrel means supporting the parison and including a rotatable spindle permitting the parison to rotate, and wherein the rotatable spindle includes an upper portion and the first locking means comprising a taper lock on said upper portion; and
   first locking means comprising a taper lock affixed to the holding means and second locking means affixed to a taper lock means affixed to at least one blow mold portion, said first and second locking means being engageable with each other when the blow mold portions are in a closed position to align and clamp the holding means to the blow mold, whereby blowing force from the high pressure fluid is transmitted to the engaged locking means.

* * * * *

UNITED STATES PATENT AND TRADEMARK OFFICE
CERTIFICATE OF CORRECTION

PATENT NO. : 5,137,443
DATED : August 11, 1992
INVENTOR(S) : OSCAR MUNOZ ET AL.

It is certified that error appears in the above-identified patent and that said Letters Patent is hereby corrected as shown below:

In Column 5, claim 1, line 31, "parisons" should read --parison--.

In Column 5, claim 1, line 47, "positions" should read --position--.

In Column 6, claim 6, line 5, "parisons" should read --parison--.

In Column 6, claim 6, line 22, "positions" should read --position--.

In Column 6, claim 8, line 34, "parisons" should read --parison--.

In Column 6, claim 8, lines 48-49, delete "affixed to" and insert --comprising--.

In Column 8, claim 16, line 1, "parisons" should read --parison--.

In Column 8, claim 16, lines 13-14, delete "affixed to" and insert --comprising--.

Signed and Sealed this

Thirty-first Day of August, 1993

*Attest:*

BRUCE LEHMAN

*Attesting Officer*      *Commissioner of Patents and Trademarks*